Dec. 28, 1926.
E. PIRON
1,612,218
METHOD OF REMOVING AIR FROM WATER
Original Filed July 10, 1922
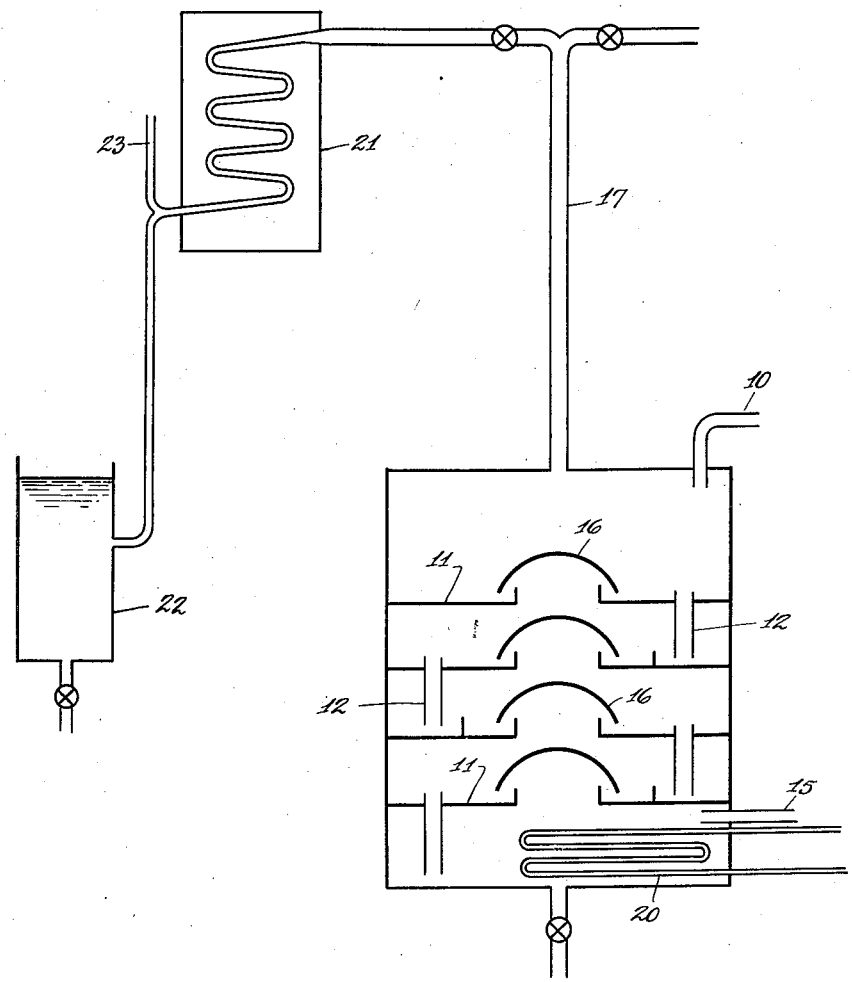
INVENTOR
Emil Piron
BY Arthur L. Kent
his ATTORNEY Patented Dec. 28, 1926.

1,612,218

UNITED STATES PATENT OFFICE.

EMIL PIRON, OF NEW YORK, N. Y.

METHOD OF REMOVING AIR FROM WATER.

Application filed July 10, 1922, Serial No. 574,049. Renewed March 4, 1926.

For certain industrial purposes, it is desirable to remove from water the air which most water contains. This has been done heretofore by several methods, all of which are more or less inefficient and uneconomical because they are dependent in a large measure on the heating of the water to a relatively high temperature which, while it drives off much the larger portion of the occluded air, also carries off in the form of vapor a considerable percentage of the water itself, so that not only is a relatively large amount of heat required to raise the water to the desired temperature, but unless special precautions are taken to prevent it, the escaping vapor and the heat in it are lost. By the method which is described hereinafter, I obviate these defects and provide a means by which practically all of the air may be driven from the water with a smaller, or no, expense of heat.

In practice, I use a distilling column divided into any suitable number of compartments, and into the top of the column I introduce the water from which the air is to be driven. As is well understood in the use of such columns, this water may be passed down successively through the different compartments formed by the plates and will pass out through an outlet at the bottom of the column. At the same time, and as the water is passing down through the column, it is brought in contact with a vapor or gas passing upward through the column. This vapor or gas may be some fixed gas, such as ordinary illuminating gas or natural gas, or, as I prefer for some purposes, a vapor of liquid which is non-miscible with water, such, for instance, as tetrachloride of carbon.

The method may be carried out and the water successfully deaerated at temperatures materially below 100° C., the normal boiling point of water. When a fixed gas, such as illuminating gas, is used as the ascending gas, this gas will take up and carry off the air contained in the water at ordinary room temperature so that no consumption of heat is required for affecting the deaeration.

When the vapor of liquid non-miscible with water, such as tetrachlorids of carbon, is used, the method may be carried out at a temperature as low as 40° C. so that the consumption of heat is small. In this case, a part of the method consists in recovering the liquid by passing the vapor and the air contained therein into a condenser in which the liquid vapor will be condensed while the air will escape.

The accompanying drawing shows diagrammatically and in elevation an ordinary distilling column in which the method may be carried out. In practicing the method by means of the apparatus shown, water is introduced through a pipe 10 at the top of the column and flows down over the plates 11 and through the pipes 12 connecting the compartments formed by the plates. The fixed gas, or the liquid non-miscible with water whose vapor is to be used, is introduced into the bottom of the column through a pipe 15. In the passage of the gas or vapor up through the column it is brought into intimate contact with the descending water by means of the usual deflectors 16. The gas or vapor, together with the air which it takes from the water, escapes at the top of the column through a pipe 17.

If the vapor of a liquid non-miscible with water is used, a heating coil 20 may be introduced at the bottom of the column and the vapor escaping through the pipe 17 may be led through a condenser 21. The liquid condensed from the vapor is collected in a tank 22 for re-use, and the air escapes through an outlet 23.

I claim:

1. The method of deaerating water, which consists in bringing the water to be deaerated into contact with a fixed air-absorbing gas at a temperature materially less than 100° C. by passing the water and gas in opposite directions through a distilling column.

2. The method of deaerating water, which consists in bringing the water to be deaerated into contact, at a temperature materially less than 100° C., with the vapor of a liquid which is non-miscible with water and whose vapor is capable of absorbing air, by passing the water and said vapor through a distilling column in opposite directions.

3. The method of deaerating water, which consists in bringing the water to be deaerated into contact with the vapor of a liquid non-miscible with water at a temperature materially less than 100° C. by passing the water and said vapor through a distilling column in opposite directions, and condensing the vapor after it has passed through the column.

In testimony whereof I have hereunto set my hand.

EMIL PIRON.